United States Patent Office 2,842,444
Patented July 8, 1958

2,842,444

METHOD OF FORMING MOULDS FOR PRECISION CASTING

Harold Garton Emblem, Melbourne, and Desmond Joseph Cloherty, Chellaston, England, assignors to Rolls-Royce Limited, Derby, England No Drawing. Application July 19, 1954
Serial No. 444,364

Claims priority, application Great Britain August 18, 1953

9 Claims. (Cl. 106—38.3)

In precision investment casting processes a pattern is invested in a refractory material and then subsequently removed producing a mould in which the metal is cast to obtain a cast article.

The pattern is commonly made from wax or other low melting expendable material, and is then removed by melting, dissolving in a suitable solvent or by some mechanical process.

Moulds may also be formed by investing separately divided patterns of a solid non-expendable nature which are subsequently removed leaving a number of part moulds which can be assembled together to form a complete mould. Such "part moulds" are for convenience included in the term "mould used herein."

The investment material may also be used for the production of cores which are assembled in the casting mould, and in speaking hereinafter of moulds it is to be understood that cores are also contemplated.

It is known to prepare a binding agent for the refractory material by carefully reacting an aqueous solution of an inorganic alkali metal silicate, generally sodium silicate, with an aqueous solution of a mineral acid, generally either nitric acid or hydrochloric acid.

Typical binders prepared by this process contain about 5 percent of silica and have a shelf life of about 24 hours.

One disadvantage of this binder is that the alkali metal associated with the soluble silicate acts to reduce the refractoriness of the mould, which in turn may give rise to the formation of slag when casting takes place.

Binders of higher silica content would be expected to give stronger moulds, thus enabling more intricately shaped objects to be cast. If however, the proportion of alkali metal silicate were to be increased, a still greater proportion of alkali metal would be present, reducing still further the refractoriness of the mould and at the same time the shelf life of the liquid would be shorter.

We have now found that a mould having greatly increased strength may be prepared from a refractory material by using a binding liquid comprising a mixture of a stable substantially electrolyte-free colloidal dispersion of silica in water with the acid reaction products formed by adding an aqueous solution of an alkali metal silicate to an excess of an aqueous solution of a mineral acid.

A stable substantially electrolyte-free colloidal dispersion of silica in water is frequently referred to as a stable silica sol or aquasol.

By means of this invention the concentration of silica in the liquid is increased without at the same time increasing the alkali metal concentration and there is thus produced a mould which is both stronger and more refractory.

The strength of the mould can be varied by changing the amount of silica sol which is added.

The excess of aqueous solution of mineral acid to which the aqueous solution of alkali metal silicate is added should preferably not be so great as to make the acid reaction products formed thereby more than 0.08 N in acid.

It is, however, essential to have sufficient acid present to react with any alkali present in the refractory filler and leave the investment mixture slightly acid because if sufficient acid is not present the investment mixture will set very rapidly. This is particularly important if the refractory filler contains an appreciable proportion of magnesia.

If therefore, more acid is required than is present in the acid reaction products as before stated, extra acid should be added to these products immediately before the addition of the silica sol during which operation the mixture should be stirred.

Examples of suitable soluble silicates for the production of the acid reaction products are sodium silicate, potassium silicate and ammonium silicate. A preferred sodium silicate has a specific gravity of 1.3 and a $Na_2O/SiO_2$ ratio of 1:3.8.

Examples of suitable mineral acids for the production of the acid reaction products are hydrochloric acid, phosphoric acid and nitric acid. Of these, nitric acid is preferred.

The silica sol may be prepared by reacting a water soluble inorganic silicate such as sodium silicate with an ion exchange resin in known manner, and concentrating the resultant solution to a silica concentration of at least 30 percent.

Other methods of preparing such silica sols are known and may be employed.

Typical silica sols which may be used in carrying out this invention are sold under the registered trademark "Syton" and have the following properties:

Silica sol No. 1:
    Silica content _____ 15 percent.
    pH _____ 10.0.
    Average particle diameter _____ 1500 A.
    Sold as Synton C.

Silica sol No. 2:
    Silica content _____ 30 percent.
    pH _____ 10.0.
    Average particle diameter _____ 250 A.
    Sold as Syton 2X.

Suitable refractory materials from which the mould may be prepared include silica, the aluminum silicates such as mullite, sillimanite, calcined kaolin and calcined fireclay grog, together with zircon and zirconia. In these materials the lime, magnesia and alkali content preferably should not exceed 4%. It will be realised that other refractory materials may be used in addition to those listed, provided they do not have an excessive alkali content. The binder liquid may also include wetting agents and/or foam inhibitors.

One example of the preparation of an investment mould using a binder liquid according to this invention is as follows:

EXAMPLE 1

The binder is prepared as follows:

4,000 cc. of sodium silicate solution having a specific gravity 1.3 and a $Na_2O/SiO_2$ ratio of 1:3.8 are poured into 6,000 cc. of water and thoroughly stirred. The resulting solution is adjusted by the addition of water or sodium silicate until 25 cc. of solution are equivalent to 28.0±0.1 cc. of N/1 hydrochloric acid using screened methyl orange as indicator. The sodium silicate solution is thus between 1.124 N and 1.116 N in alkali.

1,000 cc. of concentrated nitric acid are diluted with 10,000 cc. of water and thoroughly stirred. The solution is adjusted by dilution with water or addition of nitric acid until 25 cc. of solution are equivalent to 38.0±0.1 cc. of N/1 sodium hydroxide using screened methyl orange as indicator. The nitric acid solution is thus between 1.524 N and 1.516 N in acid.

5,460 cc. of the dilute sodium silicate solution are run into 4540 ccs. of the rapidly stirred dilute nitric acid solution. During this operation it is essential to prevent too rapid addition of the sodium silicate solution in order to avoid gelation while mixing. When mixing is complete the solution is adjusted either by the addition of dilute sodium silicate or by addition of dilute nitric acid until 100 cc. of solution are equivalent to 8.0±0.1 cc. of N/1 sodium hydroxide using screened methyl orange as indicator. After adjustment of the solution, 16 cc. of 2 ethyl hexanol were added as a foam inhibitor together with 42 cc. of Teepol wetting agent. Teepol is the registered trademark under which is sold a surface active agent based on sodium higher alkyl sulphates.

The mould investment slurry is then prepared as follows:

6,300 cc. of the binder liquid prepared as above were further acidified with 330 cc. of concentrated hydrochloric acid solution. 15,800 cc. of Syton 2X (silica sol No. 2) were added immediately, the liquid being stirred during the addition. A mould investment slurry was prepared by adding to the resulting liquid 224 lbs. of a refractory filler containing approximately equal parts by weight of fine zircon sand and calcined kaolin. The refractory filler had the chemical analysis and particle size distribution given below. The addition of concentrated hydrochloric acid is necessary to counteract the alkalinity of the filler.

On vibration of the invested patterns to form a mould by consolidating the refractory in the slurry a considerable volume of surplus liquid is obtained when packing is complete. This surplus liquid may be recovered for further use after the addition of acid to inhibit gelation.

*Analysis of refractory filler*

Chemical analysis: | Percent
--- | ---
$ZrO_2$ | 39.61
$Al_2O_3$ | 18.43
$SiO_2$ | 41.42
$Fe_2O_3$ | 0.10
$TiO_2$ | 0.22
Alkali | 1.23

*Particle size analysis*

Retained on British standard sieve: | Percent
--- | ---
12 | --
16 | 0.5
22 | 8.0
30 | 13.4
36 | 4.4
44 | 3.2
60 | 5.4
72 | 1.8
100 | 6.8
120 | 13.5
150 | 10.3
200 | 13.5
Pass 200 | 19.1

Other examples of this invention are as follows:

EXAMPLE 2

3150 cc. of the acid reaction products formed by adding an aqueous solution of sodium silicate to an aqueous solution of nitric acid, prepared as described in Example 1, were further acidified with 120 cc. of concentrated hydrochloric acid solution. 10,000 cc. of Syton 2X (silica sol No. 2) were added immediately, the liquid being stirred during the addition. A mould investment slurry was prepared by adding to the resulting liquid 112 lbs. of a refractory filler containing approximately equal parts by weight of fine zircon sand and calcined kaolin. The refractory filler had the same chemical analysis and particle size distribution as the filler used in Example 1.

These quantities give a much more fluid investment slurry, which therefore packs in less time when the invested pattern is vibrated and consequently speeds up the investment process. The gel time of the investment slurry may be lengthened by increasing the amount of concentrated hydrochloric acid solution. An amount in excess of 180 cc. gives an inconveniently long gel time. A considerable volume of surplus liquid is obtained when packing is complete. This surplus liquid may be recovered for further use after addition of acid to inhibit gelation.

If desired, the Syton 2X (silica sol No. 2) may be replaced by the same volume of Syton C (silica sol No. 1). However, this gives a weaker mould.

EXAMPLE 3

3360 cc. of the acid reaction products formed by adding an aqueous solution of sodium silicate to an aqueous solution of nitric acid, prepared as described in Example 1, were further acidified with 250 cc. of concentrated hydrochloric acid solution. 15,000 cc. of Syton 2X (silica sol No. 2) were added immediately, the liquid being stirred during the addition. 112 lb. of calcined high alumina fireclay grog were added to the resulting liquid, to give a mould investment slurry from which the mould was formed by vibration of the invested pattern to consolidate the refractory in the slurry. The calcined fireclay grog had an alumina content of 44% the particle siz distribution being given below.

B. S. S. 410 sieve No.: | Percent retained
--- | ---
16 | 1.6
30 | 22.8
52 | 20.0
72 | 10.3
100 | 7.4
150 | 9.1
200 | 4.2
Pass 200 | 25.3

The increase in the volume of concentrated hydrochloric acid is necessary because of the relatively high alkali content of the fireclay grog.

EXAMPLE 4

6,000 cc. of the acid reaction products formed by adding an aqueous solution of sodium silicate to an aqueous solution of nitric acid, prepared as described in Example 1, were further acidified with 250 cc. of concentrated hydrochloric acid, being approximately 5% of the products' volume. 12,000 cc. of Syton 2X (silica sol No. 2) were added immediately, the liquid being stirred during the addition. A mould investment slurry was prepared by adding to the resulting liquid 26 lbs. of zircon, all of which passed a 200 mesh B. S. S. 410 sieve, followed by 1 cwt. of calcined high alumina fireclay grog, which had an alumina content of 44%, the particle size distribution being given below.

B. S. S. 410 sieve No.: | Percent retained
--- | ---
16 | 1.3
30 | 28.2
52 | 22.8
72 | 10.5
100 | 7.8
150 | 7.5
200 | 3.8
Pass 200 | 18.0

The mould was formed by vibration of the invested pattern to consolidate the refractory in the slurry.

EXAMPLE 5

10 litres of liquid recovered from moulds prepared from the investment slurry described in Example 2 using Syton 2X (silica sol. No. 2) were acidified with 175 cc. of concentrated hydrochloric acid. 3150 cc. of Syton 2X (silica sol No. 2) were then added, the mixture being stirred during this addition. A mould investment slurry was prepared by adding to the resulting mixture 112 lbs. of the refractory described in Example 1. The mould was formed by vibration of the invested pattern to consolidate the refractory in the slurry.

In whatever way the slurry is prepared, the resulting moulds after vibration are left at normal temperature for 24 to 48 hours, to gel the binding liquid. The mould is then heated at a temperature between 95° and 100° C. for at least 24 hours, to remove the wax pattern if such a pattern has been invested. (There will of course be no such pattern in the case of a core.) The mould is then gradually heated to a temperature of approximately 1,000° C. over a period of 8 hours, and is held at approximately 1,000° C. for at least two hours, and preferably for not less than ten hours prior to the casting operation.

By means of this invention it has been found possible to prepare highly refractory moulds of great strength. These moulds have been found to give satisfactory results when the article to be cast incorporates one or more long slender cores as are used in the production of certain hollow castings, for example hollow turbine stationary blades of gas turbine engines.

A further advantage of the binding liquid according to this invention is that it is water based and therefore does not give rise to a fire or explosion risk.

What we claim is:

1. The method of forming a mould for precision casting which includes adding an aqueous solution of an alkali metal silicate to an excess of an aqueous solution of a mineral acid, mixing with the resultant acid reaction products so formed a stable substantially electrolyte free colloidal dispersion of silica in water alone and using the resultant liquid to bind a refractory mould material.

2. The method claimed in claim 1 in which the acid reaction products are not more than 0.08 N in acid.

3. The method claimed in claim 1 in which extra acid is added immediately before the addition of the silica sol.

4. The method claimed in claim 1 in which the silicate is selected from the group consisting of sodium silicate, potassium silicate and ammonium silicate.

5. The method claimed in claim 1 in which the acid used for the production of the acid reaction products is selected from the group consisting of hydrochloric phosphoric and nitric acids.

6. The method of preparing a mould for precision casting which includes forming a slurry by adding an aqueous solution of an alkali metal silicate to an excess of an aqueous solution of a mineral acid, mixing with the acid reaction products so formed a stable substantially electrolyte-free colloidal dispersion of silica in water and adding a refractory material to the binding liquid so formed, investing an expendable pattern with said slurry, allowing the mould to stand while the binding liquid gels, causing removal of the expendable pattern by gradually heating the mould to a temperature of the order of 1000° C. and holding the same at such temperature for at least 2 hours before casting.

7. The method of preparing a core element for precision casting which includes forming a slurry by adding an aqueous solution of an alkali metal silicate to an excess of an aqueous solution of a mineral acid, mixing with the acid reaction products so formed a stable substantially electrolyte-free colloidal dispersion of silica in water and adding a refractory material to the binding liquid so formed, shaping the slurry to the required core form, allowing the same to stand while the binding liquid gels, gradually heating the same to a temperature of the order of 1000° C. and holding the same at such a temperature for at least 2 hours before casting.

8. The method of forming a mould for precision casting which includes adding an aqueous solution of an alkali metal silicate to an excess of an aqueous solution of a mineral acid to produce acid reaction products not more than 0.08 N in acid, adding additional mineral acid with stirring, immediately adding to the acidified acid reaction products a quantity greater than that of said reaction products of a stable substantially electrolyte free colloidal dispersion of silica in water only, and using the resultant liquid to bind a refractory mould material.

9. The method of forming a mould for precision casting which includes adding a slightly alkaline reaction aqueous solution of an alkali metal silicate to such a quantity of an aqueous solution of a mineral acid as to produce acid reaction products of not more than 0.08 N acid, adding not more than about 5% of the products' volume of a concentrated mineral acid with stirring, immediately mixing with the acidified acid reaction products a quantity of a stable substantially electrolyte free colloidal dispersion of silica in water only, in an amount of approximately twice that of the said products, and using the resultant liquid to bind a refractory mould material.

References Cited in the file of this patent

UNITED STATES PATENTS

| | | |
|---|---|---|
| 2,380,945 | Collins | Aug. 7, 1945 |
| 2,441,695 | Feagin et al. | May 18, 1948 |
| 2,524,358 | Robey | Oct. 3, 1950 |
| 2,601,235 | Alexander et al. | June 24, 1952 |
| 2,680,890 | Moor et al. | June 15, 1954 |
| 2,701,902 | Strachan | Feb. 15, 1955 |

OTHER REFERENCES

Iler: "The Colloid Chemistry of Silica and Silicates," published by Cornell University Press (1955), pages 45, 48–49.